(12) United States Patent
Sangret

(10) Patent No.: US 6,269,709 B1
(45) Date of Patent: Aug. 7, 2001

(54) APPARATUS FOR AUTOMATIC CONTROL OF THE CLEARANCE BETWEEN GEARS

(75) Inventor: Henry C. Sangret, St. Clair Shores, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/431,810

(22) Filed: Nov. 2, 1999

(51) Int. Cl.$^7$ ........................................ F16H 1/16
(52) U.S. Cl. .................. 74/398; 74/400; 74/411.5; 74/425; 74/500; 74/571 M
(58) Field of Search ................... 74/89.14, 398, 74/400, 411.5, 425, 500, 571 M

(56) References Cited

U.S. PATENT DOCUMENTS

| | | | |
|---|---|---|---|
| 854,999 | * 5/1907 | Grauhering | 74/441 X |
| 1,072,282 | * 9/1913 | Waninger | 74/425 X |
| 1,443,685 | * 1/1923 | Huff | 74/500 |
| 2,335,606 | * 11/1943 | Pelphrey | 74/396 |
| 3,429,201 | * 2/1969 | Zucchellini | 74/427 X |
| 4,407,544 | 10/1983 | Bahring . | |
| 4,586,393 | * 5/1986 | Mooney et al. | 74/425 X |
| 4,664,211 | 5/1987 | Oshita et al. . | |
| 4,979,404 | 12/1990 | Nakata et al. . | |
| 4,993,277 | * 2/1991 | Adam et al. | 74/425 |
| 5,078,225 | 1/1992 | Ohmura et al. . | |
| 5,445,237 | 8/1995 | Eda et al. . | |
| 5,456,330 | 10/1995 | Kojima et al. . | |
| 6,044,723 | * 4/2000 | Eda et al. | 74/388 PS |

* cited by examiner

Primary Examiner—Allan D. Herrmann
(74) Attorney, Agent, or Firm—Tarolli, Sundheim, Covell, Tummino & Szabo L.L.P.

(57) ABSTRACT

An apparatus (10) includes first (20) and second (40) meshing gears, a rotatable eccentric (50), a torsion spring (70), and a rotation blocking member (80). The first gear (20) is rotatable about a first axis (22) and the second gear (40) is rotatable about a second axis (42). The rotatable eccentric (50) supports the first gear (20) for rotation about the first axis (22). Rotation of the eccentric (50) in a first direction (54) causes the first axis (22) and the first gear (20) to move toward the second axis (42). The torsion spring (70) biases the eccentric (50) for rotation in the first direction (54). The rotation blocking member (80) prevents rotation of the eccentric (50) in a second direction (56) opposite the first direction (54).

9 Claims, 3 Drawing Sheets

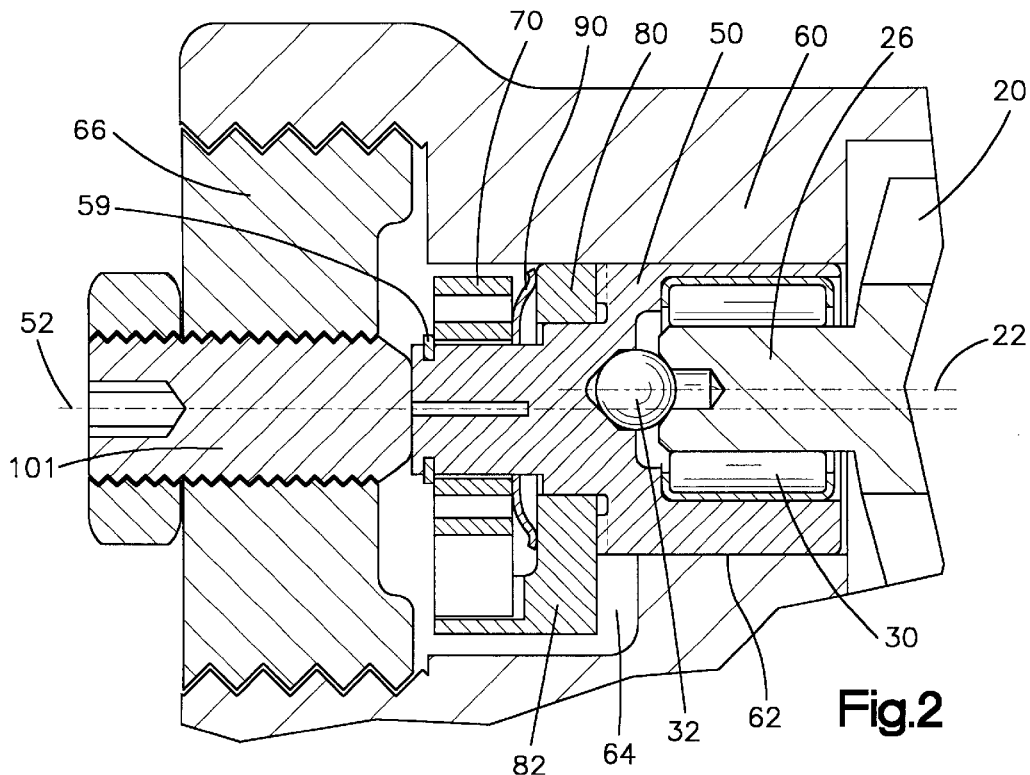
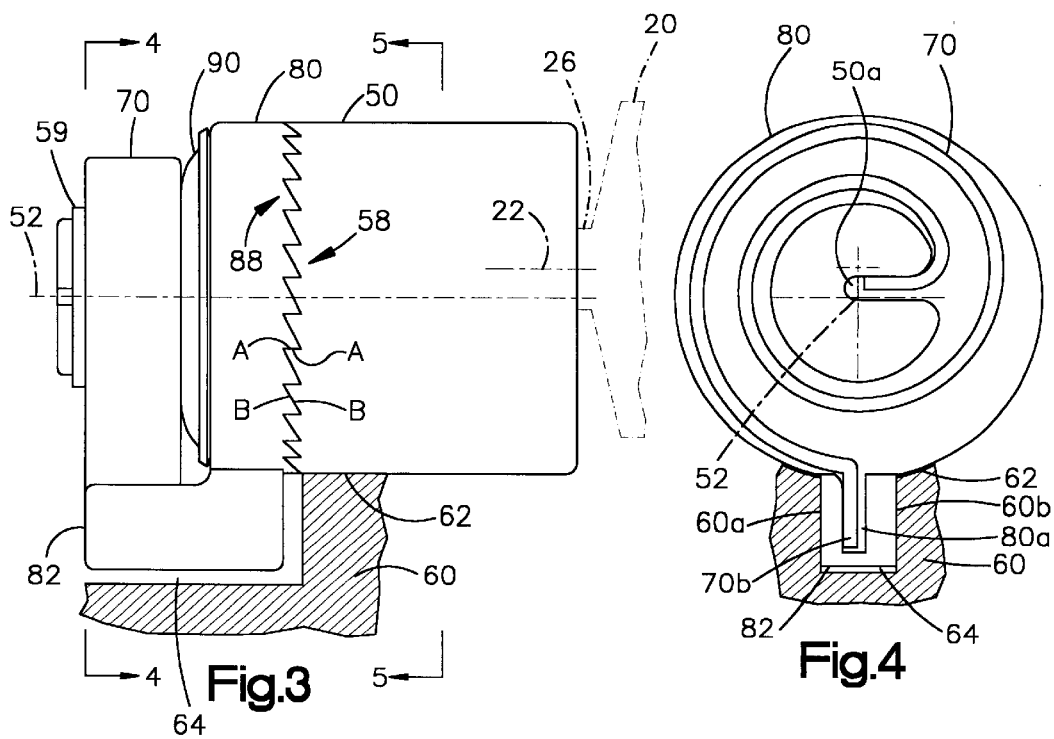

APPARATUS FOR AUTOMATIC CONTROL OF THE CLEARANCE BETWEEN GEARS

FIELD OF THE INVENTION

This invention relates to an apparatus for controlling the clearance between meshing gear teeth and, more particularly, to an apparatus for controlling the clearance between teeth of a worm gear which mesh with teeth of a worm wheel.

BACKGROUND OF THE INVENTION

A known electric power steering apparatus includes a torque sensor, which detects steering torque, and an electric motor which drives a vehicle steering member in accordance with the steering torque detected by the torque sensor. The output shaft of the electric motor and the vehicle steering member are typically drivingly coupled by a worm gear and worm wheel. The worm gear and worm wheel have meshing gear teeth.

Wear of the meshing gear teeth of the worm gear and worm wheel causes clearance between the meshing teeth. Such clearance is undesirable. Accordingly, adjustment mechanisms for controlling such clearance are known.

SUMMARY OF THE INVENTION

In accordance with the present invention, an apparatus includes first and second gears with meshing gear teeth, a rotatable eccentric, a torsion spring, and a rotation blocking member. The first gear is rotatable about a first axis and the second gear is rotatable about a second axis. The rotatable eccentric supports the first gear for rotation about the first axis. Rotation of the eccentric in a first direction causes the first axis and the first gear to move toward the second axis. The torsion spring biases the eccentric to rotate in the first direction. The rotation blocking member blocks rotation of the eccentric in a second direction opposite the first direction.

Rotation of the eccentric in the first direction occurs due to the bias of the torsion spring as wear between the meshing gear teeth of the first and second gears occurs. Thus, the apparatus controls the clearance between the meshing teeth of the first and second gears.

BRIEF DESCRIPTION OF THE DRAWINGS

The foregoing and other features of the present invention will become apparent to those skilled in the art to which the present invention relates upon reading the following description of the invention with reference to the accompanying drawings, wherein:

FIG. 2 is an enlarged detail view of part of the apparatus of FIG. 1;

FIG. 3 is a view of part of the apparatus of FIG. 2;

FIG. 4 is a view taken on line 4—4 of FIG. 3; and

DESCRIPTION OF PREFERRED EMBODIMENT

Figure 1:
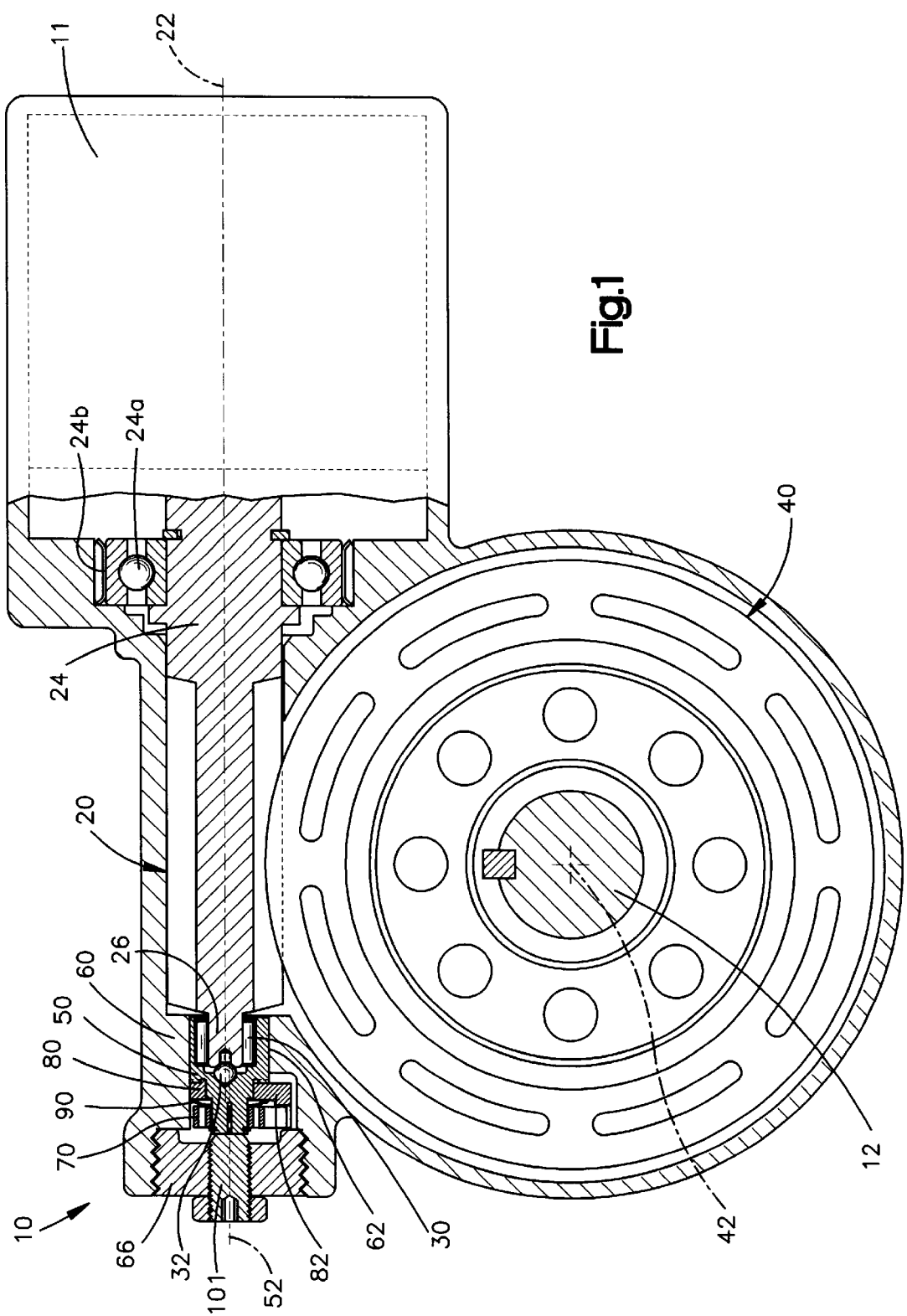
FIG. 1 is a schematic view, partially in section, of an apparatus in accordance with a preferred embodiment of the present invention.

As representative of the present invention, FIG. 1 illustrates an apparatus 10 including a first gear 20 and a second gear 40 meshing with the gear 20, a rotatable eccentric 50, a housing 60, a torsion spring 70, and a rotation blocking member 80. In a preferred embodiment, an electric motor 11 drives the first gear 20, and the second gear 40 drives a vehicle steering member 12.

The first gear 20 comprises a worm gear and is rotatable about a first axis 22. The second gear 40 comprises a worm wheel and is rotatable about a second axis 42. The worm gear 20 and worm wheel 40 have meshing helical gear teeth.

The worm gear 20 has projecting shaft portions 24, 26 at its opposite ends. A bearing 24a supports shaft portion 24 for rotation relative to the housing 60 about axis 22. A tolerance ring 24b encircles the bearing 24a. The tolerance ring 24b is made of spring steel and engages the housing 60 and the outer race of bearing 24a. The tolerance ring 24b enables the bearing 24a to shift radially towards axis 22 relative to the housing 60.

The eccentric 50 supports the projecting shaft portion 26 for rotation relative to the eccentric 50 about axis 22. The shaft portion 26 is located in a chamber 51 (FIG. 5) in the eccentric 50. Bearings 30, 32 are located in the chamber 51 in the eccentric 50 and are located between the eccentric 50 and the projecting shaft portion 26. The bearing 30 is a roller bearing which encircles shaft portion 26. The bearing 32 is a ball centered on the axis 22 and located in a recess in the eccentric 50 and in a recess in the tip end of shaft portion 26.

Figure 5:
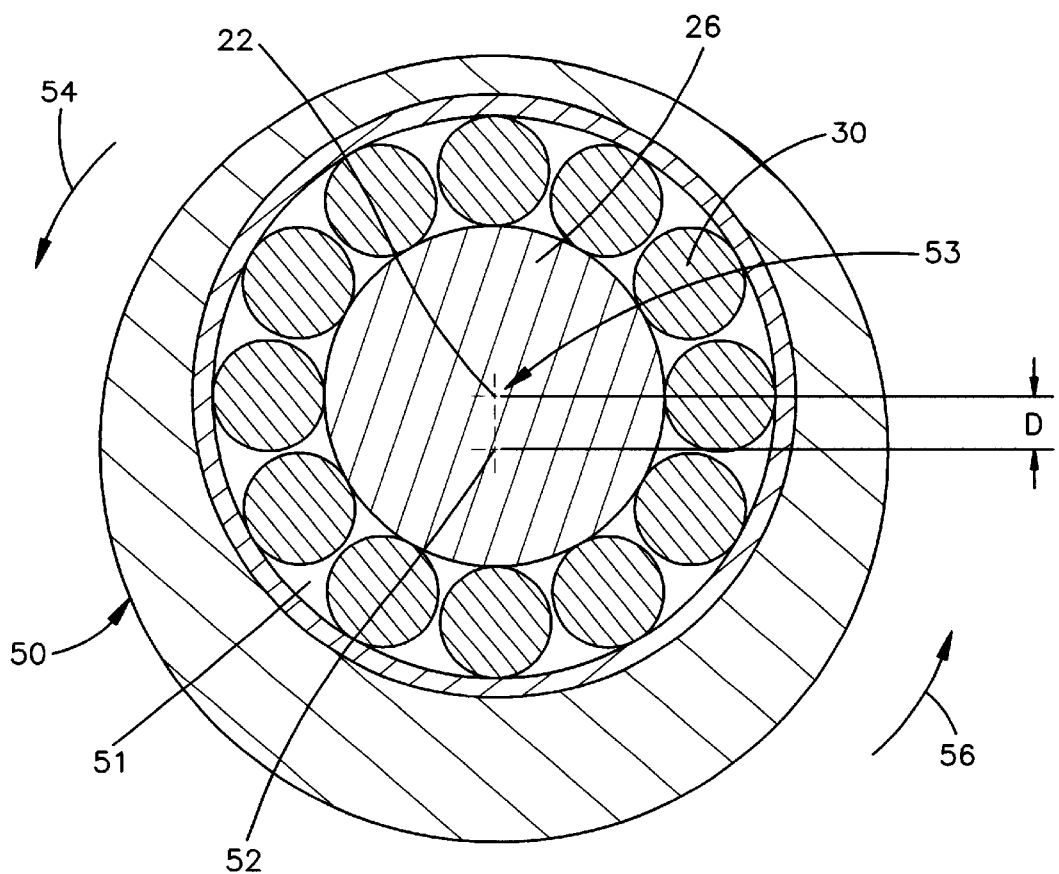
FIG. 5 is a view taken on line 5—5 of FIG. 3.

The eccentric 50 is supported in an opening 62 in the housing 60. The eccentric 50 is supported in the housing 60 for rotation about a third axis 52. The third axis 52 is generally parallel to the axis 22, but offset from the axis 22 by a predetermined distance D (FIG. 5). The distance D in FIG. 5 is exaggerated in size for illustrative purposes. Rotation of the eccentric 50 about the third axis 52 in a first direction 54 causes the center 53 of the opening 51 of the eccentric 50 to rotate about the third axis 52 and causes the first axis 22, which intersects the center 53 of the chamber 51, to move toward the second axis 42.

The torsion spring 70 (FIG. 4) biases the eccentric 50 to rotate in the first direction 54. The torsion spring 70 is coiled like a clock spring around a portion of the eccentric 50. One end 70a of the torsion spring 70 is positioned in a radially extending slot 50a in one axial end of the eccentric 50. The other end 70b of the torsion spring 70 is located in a slot 80a in the anti-rotation member 80. A snap ring 59 is located in a circumferential groove in the eccentric 50 and blocks axial movement of the torsion spring 70 in one direction to the left (as viewed in FIG. 2) relative to the eccentric 50.

The rotation blocking member 80 prevents rotation of the eccentric 50 in a second direction 56 opposite the first direction 54. As seen in FIGS. 2 and 4, the rotation blocking member 80 has a portion 82 located in a slot 64 in the housing 60. The portion 82 engages opposed surfaces 60a, 60b of the housing 60 which prevent rotation of the rotation blocking member 80 relative to the housing 60. However, the slot 64 in the housing 60 has an axial length which permits axial movement of the rotation blocking member 80 relative to the eccentric 50 and housing 60.

The eccentric 50 and the rotation blocking member 80 have axially facing surfaces which have meshing teeth 58, 88, respectively. The meshing teeth 58, 88 permit rotation of the eccentric 50 relative to the rotation blocking member 80 in the first direction 54, but block rotation of the eccentric 50 relative to the rotation blocking member 80 in the second opposite direction 56.

Each tooth of the meshing teeth 58, 88 is defined by an axially extending surface A and an angled surface B which extends at an acute angle to the surface A. The angled surfaces B of the adjacent teeth on the eccentric 50 and on the anti-rotation member 80 engage each other. The axially extending surfaces A of the adjacent teeth on the eccentric 50 and on the anti-rotation member 80 likewise engage each other. Rotation in the direction 54 can occur because the angled surfaces B can slide relative to each other in the direction 54 whereas rotation in a direction 56 opposite to direction 54 is blocked by the engaging surfaces A of adjacent teeth.

A second spring 90 biases the rotation blocking member 80 axially toward the eccentric 50 to maintain the meshing teeth 58, 88 in engagement. The spring 90 is a disk spring which encircles a portion of the eccentric. The spring 90 engages the torsion spring 70 at one axial side and engages the rotation blocking member 80 at its other axial side.

A threaded plug 66 closes the housing chamber in which the eccentric 50, the rotation blocking member 80, and the torsion spring 70 are located. The threaded plug 66 is screwed into a threaded opening in the housing 60. The threaded plug 66 carries a threaded adjustment screw 101. The adjustment screw 101 engages an axial end of the eccentric 50. When the adjustment screw 101 is screwed into the plug 66, the adjustment screw applies an axial force to the eccentric 50 which force is transmitted to the gear 20 by bearing 32. This initially adjusts the gear 20 relative to gear 40 to provide a preload on the meshing helical teeth of the gears 20 and 40.

The apparatus 10 moves the worm gear 20 and the axis 22 of the worm gear 20 toward the worm wheel 40 and the axis 42 of the worm wheels as wear of the meshing teeth of the worm wheel 40 and worm gear 20 occurs. This movement of the worm gear 20 occurs because the torsion spring 70 continuously applies a force to the eccentric 50 urging the eccentric to rotate in direction 54. The eccentric 50 moves the worm gear axis 22 approximately 0.01 millimeters toward the axis 42 of the worm gear throughout the life of the apparatus.

The rotation of the eccentric 50 in the first direction 54 also moves the first axis 22 slightly laterally relative to the third axis 52 (FIG. 5). The slight lateral movement can occur because the tolerance ring 24*b* allows bearing 24*a* to move radially a slight amount.

As the eccentric 50 rotates in the direction 54, the anti-rotation member 80 moves axially against the bias of spring 90. If the rotation of the eccentric 50 is sufficient, the teeth 58 on the eccentric 50 will ratchet over the teeth 88 on the anti-rotation member.

The meshing helical gear teeth of the worm gear 20 and worm wheel 40 create separation forces tending to separate the gears 20 and 40 and tending to rotate the eccentric 50 in the direction 56. The meshing teeth 58, 88 on the eccentric 50 and on the anti-rotation member 80 minimize the amount of separation and rotation of the eccentric 50 in the direction 56 by the surfaces A of the adjacent teeth 58, 88 engaging. When the surfaces A of adjacent teeth 58, 88 engage, no rotation of the eccentric in the direction 56 can occur.

From the above description of the invention, those skilled in the art will perceive improvements, changes and modifications. Such improvements, changes and modifications within the skill of the art are intended to be covered by the appended claims.

Having described the invention, the following is claimed:

1. An apparatus comprising:

first and second meshing gears, said first gear being rotatable about a first axis and said second gear being rotatable about a second axis;

a rotatable eccentric supporting said first gear for rotation about said first axis, rotation of said eccentric in a first direction causing said first axis and said first gear to move toward said second axis;

a torsion spring biasing said eccentric for rotation in said first direction; and a member for blocking rotation of said eccentric in a second direction opposite said first direction.

2. The apparatus as defined in claim 1 further including an electric motor for driving said first gear and a vehicle steering member driven by said second gear.

3. An apparatus comprising:

first and second meshing gears, said first gear being rotatable about a first axis and said second gear being rotatable about a second axis;

a rotatable eccentric supporting said first gear for rotation about said first axis, rotation of said eccentric in a first direction causing said first axis and said first gear to move toward said second axis;

a torsion spring biasing said eccentric for rotation in said first direction; and a member for blocking rotation of said eccentric in a second direction opposite said first direction, said first gear being a worm gear and said second gear being a worm wheel, said worm gear having projecting shaft portions at its opposite ends, said eccentric supporting one of said projecting shaft portions.

4. The apparatus as defined in claim 3 further including a housing, said eccentric being supported in an opening in said housing for rotation relative to said housing.

5. The apparatus as defined in claim 4 wherein said member is keyed to said housing to prevent rotation of said member relative to said housing, said member and said eccentric having meshing teeth which permit rotation of said eccentric in said first direction and block rotation of said eccentric in said second direction.

6. The apparatus as defined in claim 5 wherein said eccentric and said member have axially facing surfaces and said meshing teeth of said member and said eccentric are part of said axially facing surfaces.

7. The apparatus as define in claim 6 further including a second spring biasing said member axially toward said eccentric.

8. The apparatus as defined in claim 7 wherein said torsion spring has sufficient force to cause said eccentric to rotate in said first direction relative to said member, said member moving axially against the bias of said second spring when said first and second meshing gears experience a predetermined amount of wear.

9. The apparatus as defined in claim 7 further including a bearing located between said eccentric and said one projecting shaft portion.

\* \* \* \* \*